(12) United States Patent
Hung

(10) Patent No.: US 10,605,648 B2
(45) Date of Patent: Mar. 31, 2020

(54) TESTING SYSTEM FOR FLOAT LIQUID LEVEL TRANSMITTER

(71) Applicant: Fei-Che Hung, Taoyuan (TW)

(72) Inventor: Fei-Che Hung, Taoyuan (TW)

( * ) Notice: Subject to any disclaimer, the term of this patent is extended or adjusted under 35 U.S.C. 154(b) by 29 days.

(21) Appl. No.: 16/169,816

(22) Filed: Oct. 24, 2018

(65) Prior Publication Data

US 2019/0056260 A1 Feb. 21, 2019

Related U.S. Application Data

(63) Continuation of application No. 14/809,662, filed on Jul. 27, 2015, now abandoned.

(51) Int. Cl.
*G01F 25/00* (2006.01)
*G01F 23/30* (2006.01)

(52) U.S. Cl.
CPC .......... *G01F 25/0061* (2013.01); *G01F 23/30* (2013.01)

(58) Field of Classification Search
CPC .. G01F 25/00; G01F 25/0069; G01F 25/0061; G01F 23/30
USPC ......................................................... 73/1.73
See application file for complete search history.

(56) References Cited

U.S. PATENT DOCUMENTS

| | | | | |
|---|---|---|---|---|
| 5,363,093 A | * | 11/1994 | Williams | B67D 7/08 340/605 |
| 5,665,895 A | * | 9/1997 | Hart | G01F 1/007 702/100 |
| 2014/0130874 A1 | * | 5/2014 | Burlage | G01F 23/0038 137/1 |

* cited by examiner

*Primary Examiner* — Eric S. McCall
*Assistant Examiner* — Timothy P Graves
(74) *Attorney, Agent, or Firm* — Chun-Ming Shih; HDLS IPR Services

(57) ABSTRACT

A testing system for float liquid level transmitter includes a computation unit, an operation interface, a storage unit and a display unit. The computation unit computes basic data associated with the float liquid level transmitter to obtain corresponding standard values and the display unit displays the standard values. After a float liquid level transmitter performs measurement, the computation unit fetches displayed values measured by the float liquid level transmitter and obtain an error range by comparing the displayed values with the standard values; the computation unit analyzes the error range to provide analyzed data and determines whether the float liquid level transmitter is qualified based on the error range.

8 Claims, 4 Drawing Sheets

| Calibration record | | | | |
|---|---|---|---|---|
| Project name: | | Determination result: | Qualified | |
| basic data | | | | |
| Instrument number: | LT-1491 | Liquid specific gravity S1: | | |
| Instrument type: | Float type | Liquid specific gravity S2: | | |
| Instrument brand: | ABB | Instrument length | 100 cm | |
| Error tolerance: | 0.50% | Set zero-percentage | mA | |
| Input: | 0~100% | Set 100-percentage | mA | |
| Output: | (4~20)mA | Environment information | 30°C, 50%RH | |

Calibration record

Determination result: Qualified

Project name: _____ basic data

| | | | |
|---|---|---|---|
| Instrument number: | LT-1491 | Liquid specific gravity S1: | |
| Instrument type: | Float type | Liquid specific gravity S2: | |
| Instrument brand: | ABB | Instrument length | 100 cm |
| Error tolerance: | 0.50% | Set zero-percentage | mA |
| Input: | 0~100% | Set 100-percentage | mA |
| Output: | (4~20)mA | Environment information | 30°C, 50%RH | calibration data

| Input percentage (%) | Standard value(mA) | Displayed value(mA) | Error percentage(%) | Note |
|---|---|---|---|---|
| 0 | 4.00 | 3.9984 | -0.01 | |
| 25 | 8.00 | 7.9946 | 0.01 | |
| 50 | 12.00 | 11.9978 | 0.07 | |
| 75 | 16.00 | 15.992 | 0.07 | |
| 100 | 20.00 | 19.9906 | -0.03 | |
| 75 | 16.00 | 15.9887 | 0.05 | |
| 50 | 12.00 | 11.9947 | -0.09 | |
| 25 | 8.00 | 7.9924 | -0.01 | |
| 0 | 4.00 | 3.9971 | -0.02 | |

Calibration curve

Upper path
Lower path

Tester _____   Tester   HONG

FIG.5

TESTING SYSTEM FOR FLOAT LIQUID LEVEL TRANSMITTER

CROSS-REFERENCE TO RELATED APPLICATION

This application is a continuing application of U.S. patent application Ser. No. 14/809,662, filed on Jul. 27, 2015, and entitled "TESTING METHOD FOR FLOAT LIQUID LEVEL TRANSMITTER". The entire disclosures of the above application are all incorporated herein by reference.

BACKGROUND OF THE INVENTION

Field of the Invention

The present invention relates to a testing system, especially to a testing system for float liquid level transmitter.

Description of Related Art

The conventional float liquid level transmitter can measure liquid level in a tube or an interface of two liquids with different specific gravities, and send measurement signals corresponding to 4~20 mA to test whether the liquid level in the tube is qualified.

In testing the float liquid level transmitter, liquid of a specific gravity is poured into the tube and the level of the liquid is changed during pouring the liquid. The float liquid level transmitter displays the data corresponding to different levels of the liquid and the tester manually judges whether the data sent by the float liquid level transmitter is qualified.

However, there are certain problems in manual judgement. When the measured data sent by the float liquid level transmitter has slight deviation with the standard data for the tube, the tester may erroneously judge that the float liquid level transmitter is qualified. This kind of test is not reliable.

SUMMARY OF THE INVENTION

It is an object of the present invention to provide a testing system for float liquid level transmitter. The testing system comprises a float liquid level transmitter and a testing device. The testing device comprises a computation unit electrically connected to the float liquid level transmitter; an operation interface electrically connected to the computation unit and operated to input basic data for the float liquid level transmitter, wherein the basic data is sent to the computation unit for further processing; a storage unit electrically connected to the computation unit to store an analyzed result from the computation unit; and a display unit electrically connected to the computation unit. The computation unit is configured to control the display unit to display the basic data of the testing system, a data calibration table and a calibration curve, and the computation unit is configured to control the operation interface to receive the basic data for the float liquid level transmitter; wherein the computation unit is configured to compute the basic data to obtain corresponding standard values and to control the display unit to display the standard values; wherein, after the float liquid level transmitter performs measurement, the computation unit is configured to fetch displayed values measured by the float liquid level transmitter and obtain an error range by comparing the displayed values with the standard values; the computation unit is configured to analyze the error range to provide analyzed data and determine whether the float liquid level transmitter is qualified based on the error range; wherein the computation unit is configured to generate the calibration curve based on the analyzed data and to control the display unit to display the calibration curve, the calibration curve displays all of the displayed values for various liquid heights, all of the standard values for various liquid heights; wherein the computation unit is configured to generate a determination result and to control the display unit to display the determination result to show whether the float liquid level transmitter is qualified; and wherein when a user inputs the basic data, an input percentage (%), the standard value (mA), the displayed value (mA), and the error percentage will be all shown in the data calibration table for facilitating the user to check if the float liquid level transmitter is qualified.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 5 shows the calibration report.

DETAILED DESCRIPTION OF EMBODIMENT

Figure 1:
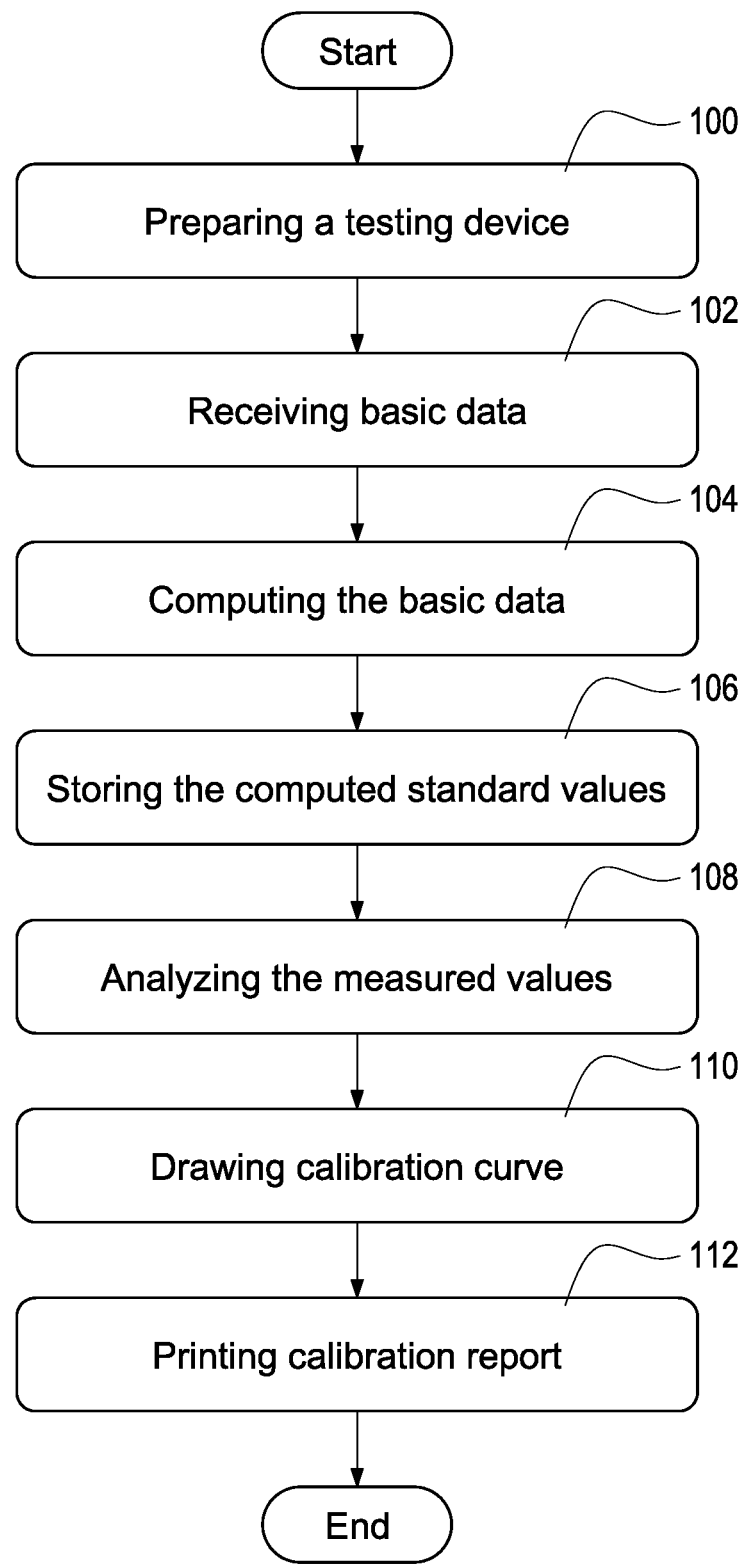
FIG. 1 shows the flowchart of the method for testing float liquid level transmitter.

FIG. 1 shows the flowchart of the method for testing float liquid level transmitter. The displayed data (measured data) of the float liquid level transmitter can be determined to be qualified or not and printed report for analyzed data and calibration curve can also be obtained.

In step 100, a testing device is prepared to analyze the error between the established data (standard value) and the measured data (measured values) sent by the float liquid level transmitter.

In step 102, data is established and the testing device (not shown) will display a basic data screen with following data fields: a project name field, a determination result field, an instrument number field, an instrument type field, an instrument brand field, a tolerance percentage (%) field, an input (measurement percentage) field, an output (output current range mA) field, a first liquid specific gravity (S1) field, a second liquid specific gravity (S2) field, an instrument length (such as float tube length) field, a set zero percentage (0%) field, a set 100 percentage (100%) field, and an environment information field. The operation interface of the testing device is used to input basic data. In this step, the instrument is float liquid level calibration recorder and the operation interface is composed of a plurality of keys.

In step 104, the basic data is computed. More particularly, the computation unit in the testing device calculates the standard values based on the input basic data (length× specific gravity). In this step the computation unit is, for example, a microprocessor.

In step 106, the computed standard values are stored. More particularly, the computation unit in the testing device stores the computed standard values in the storage unit, where the storage unit is, for example, a memory.

In step 108, the measured values are analyzed. After the standard values are computed from the input basic data, the testing device fetches the measured data (values) from the external float liquid level transmitter and further analyzes (determines) the error values between the measured (displayed) values and the standard values. The testing device determines whether the measured data from the external float liquid level transmitter is qualified or not based on the error values and then shows the result on the display thereof. In this step, the recorded analyzed data comprises input percentage (%), standard values (mA), displayed values (mA) and error values (%).

In step 110, the measurement curve is generated, where the analyzed result in step 108 is drawn and shown on the display of the testing device.

In step 112, the report is finished, where the above analyzed data and curve are sent to a printer for printing.

Figure 2:
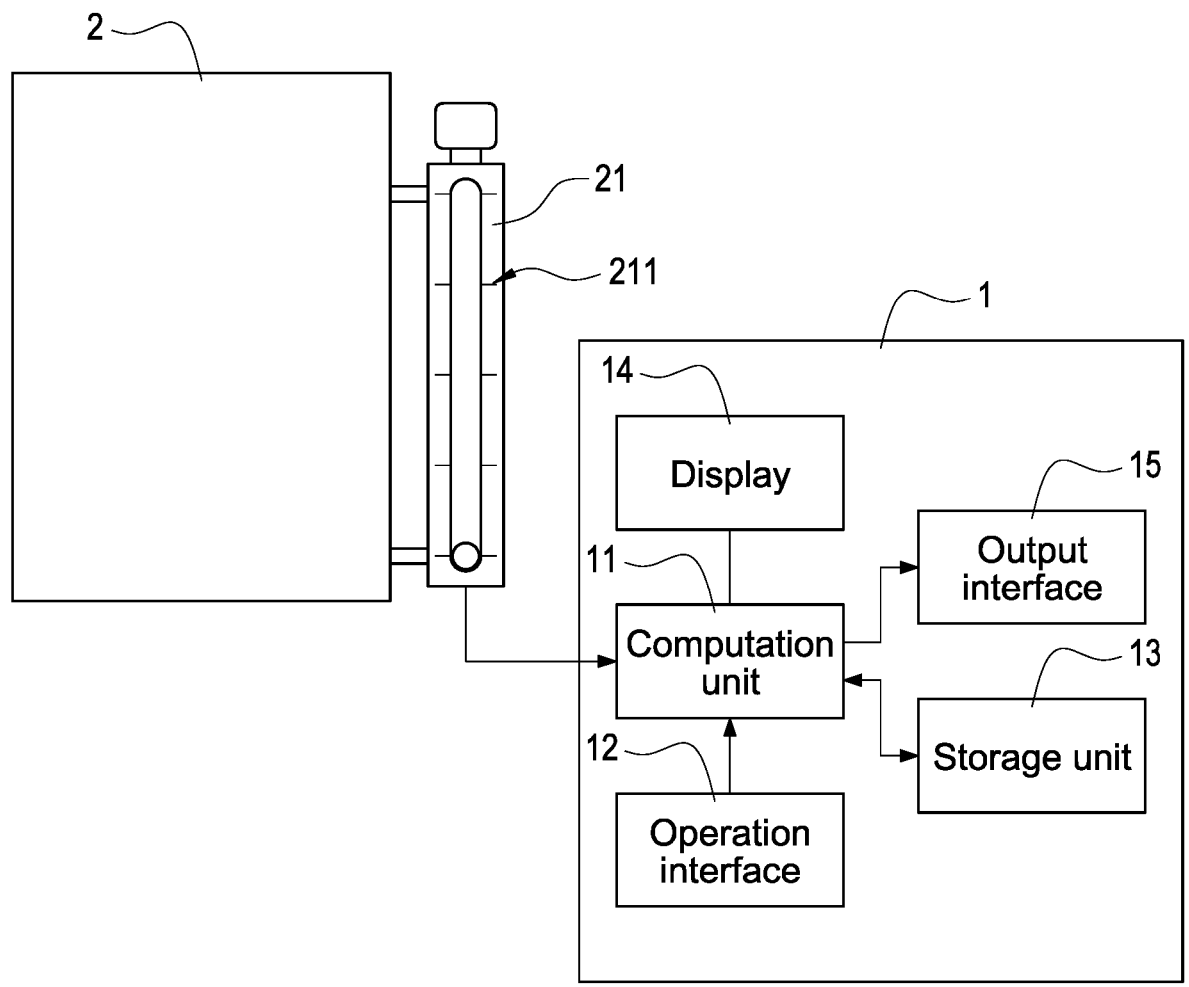
FIG. 2 shows the schematic view of the testing system where the testing device electrically connects to the instrument.

With reference to FIG. 2, the testing device 1 is electrically connected to the float liquid level transmitter 21 of the instrument 2 (the level-sensing tube). The float liquid level transmitter 21 has liquid-level indications 211 of 0%, 25%, 50%, 75% and 100%. The testing device 1 comprises a computation unit 11, an operation interface 12, a storage unit 13, a display 14 and an output interface 15.

The computation unit 11 is electrically connected to the float liquid level transmitter 21 and computes the input basic data into standard values. The measured values according to the poured liquid into the instrument 2 (the level-sensing tube) is sent to the computation unit 11, whereby the computation unit 11 records the analyzed data and draws calibration curve. In the embodiment, the computation unit 11 is a microprocessor.

The operation interface is composed of a plurality of keys and electrically connected to the computation unit 11. The plurality of keys is operated to input the basic data for the instrument and the basic data is sent to the computation unit 11 for further processing.

The storage unit 13 is electrically connected to the computation unit 11 to store the analyzed result from the computation unit 11, namely, the input percentage (%), the standard values (mA), the displayed values (measured value) (mA) and the error values (%). In this example, the storage unit 13 is a memory.

The display 14 is electrically connected to the computation unit 11 to display the screen of basic data (basic data screen), the data calibration table and the calibration curve.

The output interface 15 is electrically connected to the computation unit 11 and also electrically connected to an external printer (not shown). The data and curve used to show qualification or not are generated by the computation unit 11 and sent to the printer for printing into a calibration report. In this example, the output interface 15 is USB or wireless transmission interface.

After the testing device establishes data, the computation unit 11 computes the standard values (mA) for testing. Afterward, the computation unit 11 analyzes the standard values (mA) with the displayed values (measured values) sent from the float liquid level transmitter 21 and determines whether the displayed values (measured values) are qualified or not. The computation unit 11 records the analyzed data and generates the calibration curve. The analyzed data and calibration curve are sent to the printer (not shown) through the output interface for printing out the analyzed data and calibration curve as calibration report for the float liquid level transmitter 21.

Figures 3, 4:
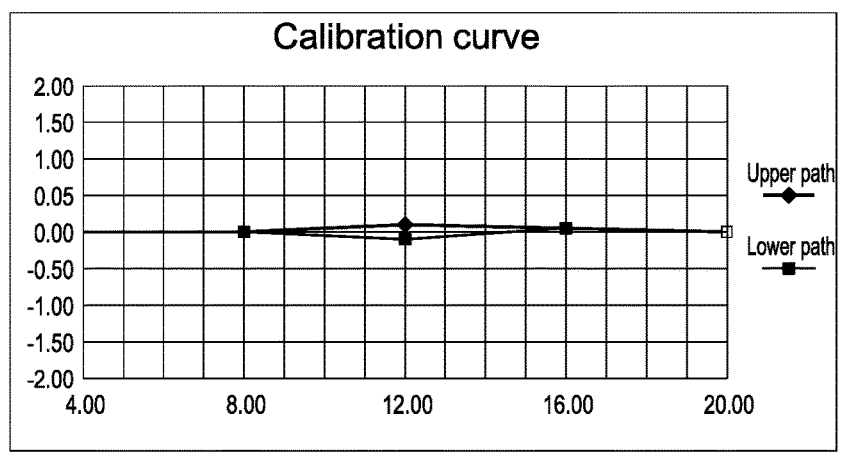
FIG. 3 shows the basic data screen.
FIG. 4 shows the calibration curve.

With reference to FIGS. 2 to 4, the testing device 1 is electrically connected to the float liquid level transmitter 21 when the float liquid level transmitter 21 is mounted on the tube 2. A liquid with a specific gravity is poured into the tube 2. The display 14 of the testing device 1 shows at least following fields after the testing device 1 starts testing: project name field 31, determination result field 32, instrument number field 33, instrument type field 34, instrument brand field 35, error tolerance field 36, input (measurement percentage) field 37, output (output current range) field 38, first liquid specific gravity field 39, second liquid specific gravity field 310, instrument length field 311, set zero-percentage field 312, set 100-percentage field 313, and environment information field 314. Moreover, the exemplary basic data input by the operation interface 11 may be as follows:

The input to the instrument number field 33 is LT-1491.
The input to the instrument type field 34 is float type.
The input to the instrument brand field 35 is ABB.
The input to the error tolerance field 36 is 0.5%.
The input to the input (measurement percentage) field 37 is 0~100%.
The input to the output (output current range mA) field 38 is 4~20 mA.
The input to the first liquid specific gravity (S1) field 39 is 0.85.
The input to the second liquid specific gravity (S2) field 310 is 0.
The input to the instrument length field 311 is 100 cm.
The input to the environment information field 314 is 30° C., 50% RH.

After above basic data are input and computed by the computation unit 11, standard values (mA) as following table (Data calibration table) will be obtained and the standard values (mA) are stored in the storage unit 13. At this time, the float liquid level transmitter 21 of the tube 2 is electrically connected to the computation unit 11 and liquid of a specific gravity is poured into the tube 2. The liquid level in the tube 2 changes as the liquid keeps pouring, and the float liquid level transmitter 21 transmits corresponding output. For example, the standard value is 4 mA for 0% height of liquid, 8 mA for 25% height of liquid, 12 mA for 50% height of liquid, 16 mA for 75% height of liquid and 20 mA for 100% height of liquid. The float liquid level transmitter 21 generates measurement (namely, displayed values) for different height of liquid and sends the displayed values to the computation unit 11. The computation unit 11 compares the displayed values with the standard values to obtain the calibration table with error values (error percentage) and further judges whether the float liquid level transmitter 21 is qualified.

During testing, the analyzed error percentage can be drawn into a calibration curve as shown in FIG. 4.

| Data calibration table | | | |
|---|---|---|---|
| Input percentage (%) | Standard value (mA) | Displayed value (mA) | Error percentage |
| 0 | 4.00 | 3.9984 | −0.01 |
| 25 | 8.00 | 7.9946 | 0.01 |
| 50 | 12.00 | 11.9978 | 0.07 |
| 75 | 16.00 | 15.992 | 0.07 |
| 100 | 20.00 | 19.9906 | −0.03 |
| 75 | 16.00 | 15.9887 | 0.05 |
| 50 | 12.00 | 11.9947 | −0.09 |
| 25 | 8.00 | 7.9924 | −0.01 |
| 0 | 4.00 | 3.9971 | −0.02 |

When the testing device 1 shows the basic data screen on the display 14 thereof, the above data calibration table is also shown on the same screen. Therefore, as user inputs the basic data, the items input through the basic data are also present at fields of Input percentage (%) and Standard value (mA).

FIG. 5 is a schematic diagram for the calibration report of the invention. After the float liquid level transmitter 21 of the tube 2 is tested and calibrated, the tester or the client can print out the calibration report 4, where the calibration report 4 comprises at least the project name 41, the determination result 42, basic data 43, calibration data 44, float liquid level transmitter symbol 45, calibration curve 46 and tester 47.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A testing system for float liquid level transmitter, the testing system comprising:
    a float liquid level transmitter;
    a testing device comprising:
        a computation unit electrically connected to the float liquid level transmitter;
        an operation interface electrically connected to the computation unit and operated to input basic data for the float liquid level transmitter, wherein the basic data is sent to the computation unit for further processing;
        a storage unit electrically connected to the computation unit to store an analyzed result from the computation unit;
        a display unit electrically connected to the computation unit;
    wherein the computation unit is configured to control the display unit to display the basic data of the testing system, a data calibration table and a calibration curve, and the computation unit is configured to control the operation interface to receive the basic data for the float liquid level transmitter;
    wherein the computation unit is configured to compute the basic data to obtain corresponding standard values and to control the display unit to display the standard values;
    wherein, after the float liquid level transmitter performs measurement, the computation unit is configured to fetch displayed values measured by the float liquid level transmitter and obtain an error range by comparing the displayed values with the standard values; the computation unit is configured to analyze the error range to provide analyzed data and determine whether the float liquid level transmitter is qualified based on the error range;
    wherein the computation unit is configured to generate the calibration curve based on the analyzed data and to control the display unit to display the calibration curve, the calibration curve displays all of the displayed values for various liquid heights, all of the standard values for various liquid heights;
    wherein the computation unit is configured to generate a determination result and to control the display unit to display the determination result to show whether the float liquid level transmitter is qualified; and
    wherein when a user inputs the basic data, an input percentage (%), the standard value (mA), the displayed value (mA), and the error percentage will be all shown in the data calibration table for facilitating the user to check if the float liquid level transmitter is qualified.

2. The testing system in claim 1, wherein fields of the basic data comprise a project name field, an instrument number field, an instrument type field, an instrument brand field, a tolerance percentage of actual calibration parameters to calculated calibration parameters field, an input field, an output field, a first liquid specific gravity field, a second liquid specific gravity field, an instrument length field, a milliamp signal value for zero percentage liquid level, a milliamp signal value for 100 percentage liquid level, and an environment information field.

3. The testing system in claim 1, wherein the testing system is configured to pour liquid of a specific gravity into a level-sensing tube connected to the float liquid level transmitter to measure the displayed values.

4. The testing system in system 3, wherein the float liquid level transmitter has liquid-level indications of 0%, 25%, 50%, 75% and 100%.

5. The testing system in claim 4, wherein the standard value is 4 mA for 0% height of liquid, 8 mA for 25% height of liquid, 12 mA for 50% height of liquid, 16 mA for 75% height of liquid and 20 mA for 100% height of liquid.

6. The testing system in claim 1, wherein the analyzed data is calibration data including liquid level fill percentage, displayed value and error.

7. The testing system in claim 1, further comprising:
    an output interface electrically connected to the computation unit and outputting the analyzed data and the calibration curve, where the analyzed data and the calibration curve are printed in a calibration report.

8. The testing system in claim 7, wherein the calibration report comprises a project name, the basic data, the calibration data, a float liquid level transmitter symbol, and the calibration curve.

* * * * *